US011223402B1

(12) United States Patent
Bondalapati et al.

(10) Patent No.: US 11,223,402 B1
(45) Date of Patent: Jan. 11, 2022

(54) ASSISTED CHANNEL APPROXIMATION FOR WIRELESS COMMUNICATION OF A SUPERCELL BASE STATION

(71) Applicant: Facebook, Inc., Menlo Park, CA (US)

(72) Inventors: Pratheep Bondalapati, Woodland Hills, CA (US); Abhishek Tiwari, Oak Park, CA (US); Srishti Saraswat, Northridge, CA (US); Mustafa Emin Sahin, Northridge, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/987,538

(22) Filed: Aug. 7, 2020

(51) Int. Cl.
| | |
|---|---|
| *H04B 7/06* | (2006.01) |
| *H04L 25/02* | (2006.01) |
| *H04B 7/155* | (2006.01) |
| *H04W 24/08* | (2009.01) |
| *H04W 16/32* | (2009.01) |

(52) U.S. Cl.
CPC ......... *H04B 7/0608* (2013.01); *H04B 7/1555* (2013.01); *H04L 25/0224* (2013.01); *H04W 24/08* (2013.01); *H04W 16/32* (2013.01)

(58) Field of Classification Search
CPC ... H04B 7/0608; H04B 7/1555; H04W 24/08; H04W 16/32; H04L 25/0224
See application file for complete search history.

(56) References Cited

U.S. PATENT DOCUMENTS

| | | | |
|---|---|---|---|
| 8,824,534 B2 | 9/2014 | Hrycak | |
| 9,692,577 B2 | 6/2017 | Liang et al. | |
| 2005/0195763 A1 | 9/2005 | Kadous et al. | |
| 2005/0261028 A1* | 11/2005 | Chitrapu | H04W 16/28 455/562.1 |
| 2009/0279589 A1 | 11/2009 | Nguyen | |
| 2015/0236872 A1 | 8/2015 | Xiong et al. | |
| 2018/0026327 A1* | 1/2018 | Hendrix | H04Q 1/15 455/562.1 |
| 2020/0267536 A1* | 8/2020 | Zhou | H04B 7/0413 |

* cited by examiner

*Primary Examiner* — Kabir A Timory
(74) *Attorney, Agent, or Firm* — Brian R. Short

(57) ABSTRACT

Apparatuses, methods, and systems for assisted channel approximation wireless communication of a supercell base station are disclosed. One apparatus includes a wireless network, wherein the wireless network includes a supercell base station comprising a plurality of antennas, a plurality of user devices, wherein the plurality of user devices is located too far away to support omnidirectional electromagnetic communication with the supercell base station, and a separate communication device located proximate to the plurality of user devices. The separate communication device operates to receive omnidirectional wireless signals from the supercell base station, characterized a transmission channel between the supercell base station and the separate communication device, and directionally transmit the characterized channel back to the base station. The supercell base station operates to directionally transmit wireless communication signals through a directional beam to the plurality of user devices based on the characterized channel.

20 Claims, 9 Drawing Sheets

Standard Base Station
Cell Deployment

Super Cell Base Station
Deployment

```
┌─────────────────────────────────────────────────────────────────────────┐
│ Omni-directionally transmitting, by a supercell base station, training  │
│ signals, wherein a plurality of user devices is located too far away to │
│ support omnidirectional electromagnetic communication with the          │
│ supercell base station                                                  │
│                                 910                                     │
└─────────────────────────────────────────────────────────────────────────┘
                                   │
                                   ▼
┌─────────────────────────────────────────────────────────────────────────┐
│ Omni-directionally receiving, by a separate communication device, the   │
│ training signals, wherein the separate communication device is located  │
│ proximate to the plurality of user devices                              │
│                                 920                                     │
└─────────────────────────────────────────────────────────────────────────┘
                                   │
                                   ▼
┌─────────────────────────────────────────────────────────────────────────┐
│ Characterizing, by the alternate transceiver, a transmission channel    │
│ between the supercell base station and the alternate transceiver        │
│                                 930                                     │
└─────────────────────────────────────────────────────────────────────────┘
                                   │
                                   ▼
┌─────────────────────────────────────────────────────────────────────────┐
│ Directionally transmitting, by the alternate transceiver, the           │
│ characterized transmission channel to the base station                  │
│                                 940                                     │
└─────────────────────────────────────────────────────────────────────────┘
                                   │
                                   ▼
┌─────────────────────────────────────────────────────────────────────────┐
│ Transmitting, by the supercell base station, wireless communication to  │
│ the plurality of user devices through a beam based on the characterized │
│ transmission channel                                                    │
│                                 950                                     │
└─────────────────────────────────────────────────────────────────────────┘
```

FIGURE 9

ASSISTED CHANNEL APPROXIMATION FOR WIRELESS COMMUNICATION OF A SUPERCELL BASE STATION

FIELD OF THE DESCRIBED EMBODIMENTS

The described embodiments relate generally to wireless communications. More particularly, the described embodiments relate to systems, methods and apparatuses for assisted channel approximation for wireless communication of a supercell base station.

BACKGROUND

Large populations around the world lack access to mobile broadband coverage. Typically, these uncovered populations live in remote rural areas of the world characterized by sparse population density, rugged terrain, lack of proper electricity or road infrastructure, low average revenue per user, demand uncertainty due to lack of device access.

Conventional mobile networks typically place base stations on 30-40 meter standard height towers. Providing coverage to large rural regions through the conventional approach requires several standard height towers and base stations. This makes conventional mobile network infrastructure deployment a very costly ordeal. The combination of high cost result in zero or negative return on investments for the network infrastructure owners and operators It is desirable to have methods, apparatuses, and systems for assisted channel approximation for wireless communication of a supercell base station.

SUMMARY

An embodiment includes a wireless network. The wireless network includes a supercell base station having a plurality of antennas, a plurality of user devices, and a separate communication device, wherein the plurality of user devices is located too far away to support omnidirectional electromagnetic communication with the supercell base station. The separate communication device is located proximate to the plurality of user devices, and the separate communication device operates to receive omnidirectional wireless signals from the supercell base station, characterized a transmission channel between the supercell base station and the separate communication device, and directionally transmit the characterized channel back to the base station. The supercell base station operates to directionally transmit wireless communication signals through a directional beam to the plurality of user devices based on the characterized channel received from the separate communication device.

Another embodiment includes a method. The method includes omni-directionally transmitting, by a supercell base station, training signals, wherein a plurality of user devices is located too far away to support omnidirectional electromagnetic communication with the supercell base station. The method further includes omni-directionally receiving, by a separate communication device, the training signals, wherein the separate communication device is located proximate to the plurality of user devices, characterizing, by the separate communication device, a transmission channel between the supercell base station and the separate communication device, directionally transmitting, by the separate communication device, the characterized transmission channel to the base station, and directionally transmitting, by the supercell base station, wireless communication to the plurality of user devices through a beam based on the characterized transmission channel.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of a method for assisted channel approximation wireless communication of a supercell base station.

DETAILED DESCRIPTION

The embodiments described include methods, apparatuses, and systems for assisted channel approximation for wireless communication of a supercell base station. For an embodiment, a separate communication device operates to estimate a transmission channel between supercell base station and the separate communication device, and communicate the estimated channel back to the supercell base station. The supercell base station uses the estimated transmission channel to form a directional beam to facilitate wireless communication with a plurality (cluster) of user devices located proximate to the separate communication device.

Figure 1:
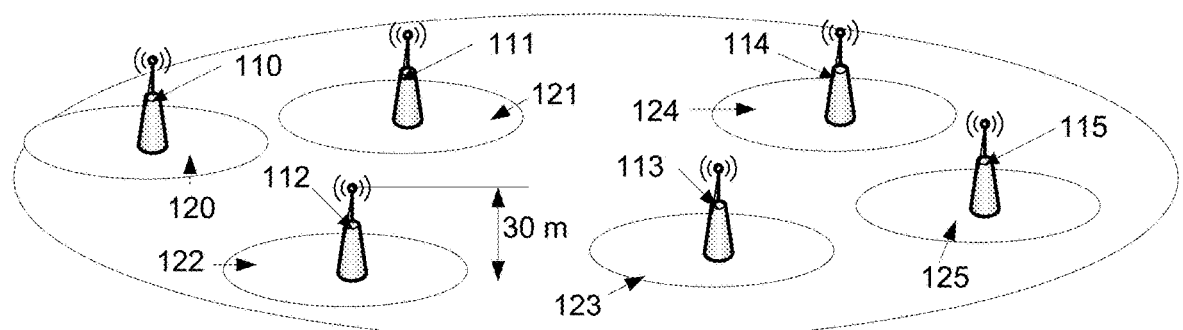
FIG. 1 shows a network that includes conventional base station towers, and a supercell base station, according to an embodiment.
Figure 1:
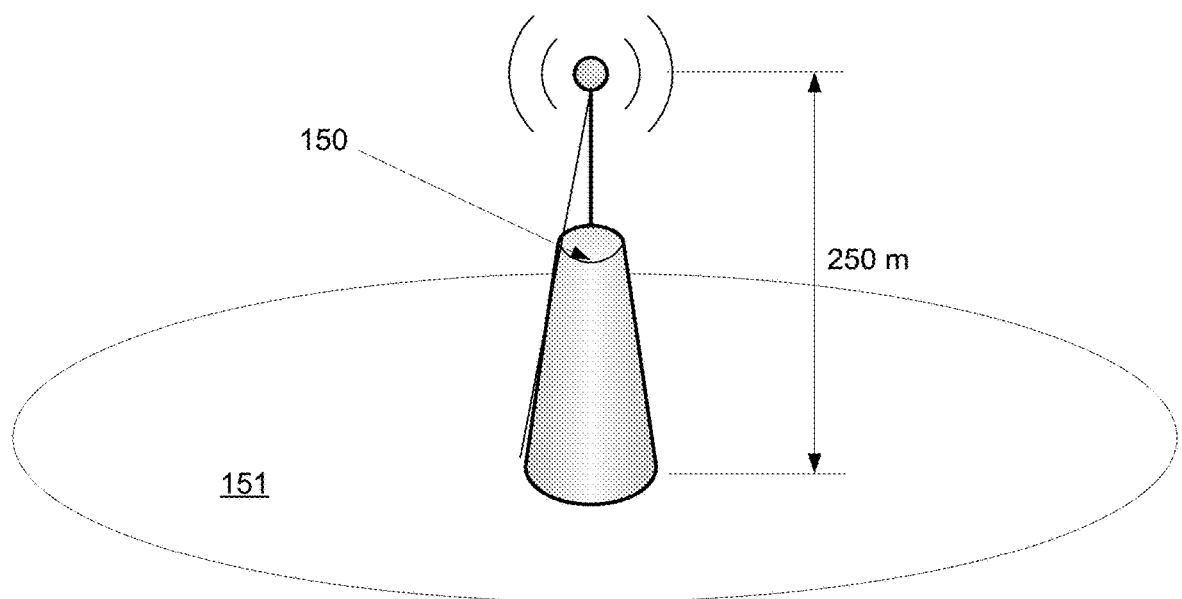

FIG. 1 shows conventional base station towers and a supercell base station tower, according to an embodiment. For an embodiment, the standard base stations 110, 111, 112, 113, 114, 115, have a height, and therefore, an antenna elevation of about 30 meters. Further, each of the standard base stations have a cell coverage area 120, 121, 122, 123, 124, 125.

FIG. 1 also shows a supercell base station tower 150 that has a coverage area 151. Elevating base stations to greater heights above ground provides improved propagation (ranges of 20-75 km) and presents an opportunity to reduce the total cost of ownership for the network infrastructure operator by deploying fewer elevated base stations to cover the same area. Further, improved propagation (coverage) range provided by an elevated base station requires the base station to serve greater capacity to satisfy the demand.

For at least some embodiments, the supercell base station tower 150 maintains a beamforming antenna that is elevated higher than antennas of standard cells. Further, due in part to the larger coverage footprint realized through the elevated beamforming antenna, the supercell base station tower 150 is operable to support higher data capacity that standard cells. For an embodiment, the supercell base station tower 150 utilizes adaptive high-order sectorization. At least some of the described embodiments include surveying sites to determine a level of power azimuth angular spectrum to determine whether the surveyed sites can support adaptive high-order sectorization by determining whether the power azimuth angular spectrum is lower than a threshold. If during the site survey, the power azimuth angular spectrum is determined to be less than a threshold amount, then site is determined to be able to support a supercell base station tower that utilizes the adaptive high-order sectorization.

For greater capacity, the spectral efficiency of the elevated base station 150 is needed since available spectrum is unlikely to change. Techniques such as Massive MIMO (multiple-input, multiple-output), MU-MIMO (multi-user, MIMO) and high order sectorization have been used to improve spectral efficiency. However, the performance of Massive MIMO and MU-MIMO techniques depend greatly on having good quality channel state feedback available at the base station. To obtain the channel state information, channel state estimation preambles are transmitted without the beamforming gain of MU-MIMO through an omni-directional antenna. However, this means that the propagation range of the base station is fundamentally limited by the range of omni-directional transmission of channel state preambles.

Deployment of tall (supercell) base stations is advantageous because cellular propagation models predict ~6 dB lower path loss upon each doubling of base station height. Elevating base stations to greater heights above ground and by using the high gain of narrow beam width sectors provides improved propagation (ranges of 20-75 km) and presents an opportunity to reduce the total cost of ownership for the network infrastructure operator by deploying fewer elevated base stations to cover the same area. Further, improved propagation (coverage) range provided by an elevated base station requires the base station to serve greater capacity to satisfy the demand. For an embodiment, the sectorized supercell base stations have a greater height than the cellular base stations.

For at least some embodiments, the tall base stations form supercells that are much larger than cells formed by standard cellular networks. For an embodiment, high-order sectoring can be provided by a Luneburg lens antenna. Further, for an embodiment, the antenna includes a high-power amplifier array. Further, base band processing of the base station can be located at a lower elevation than the antenna array of the base station, and communication signals and power can be provided to the antenna array through a fiber. Further, the described embodiments of sectorization can be waveform agnostic and allow the wireless base station to support wireless communication standards that do not utilize channel state information.

Figure 2:
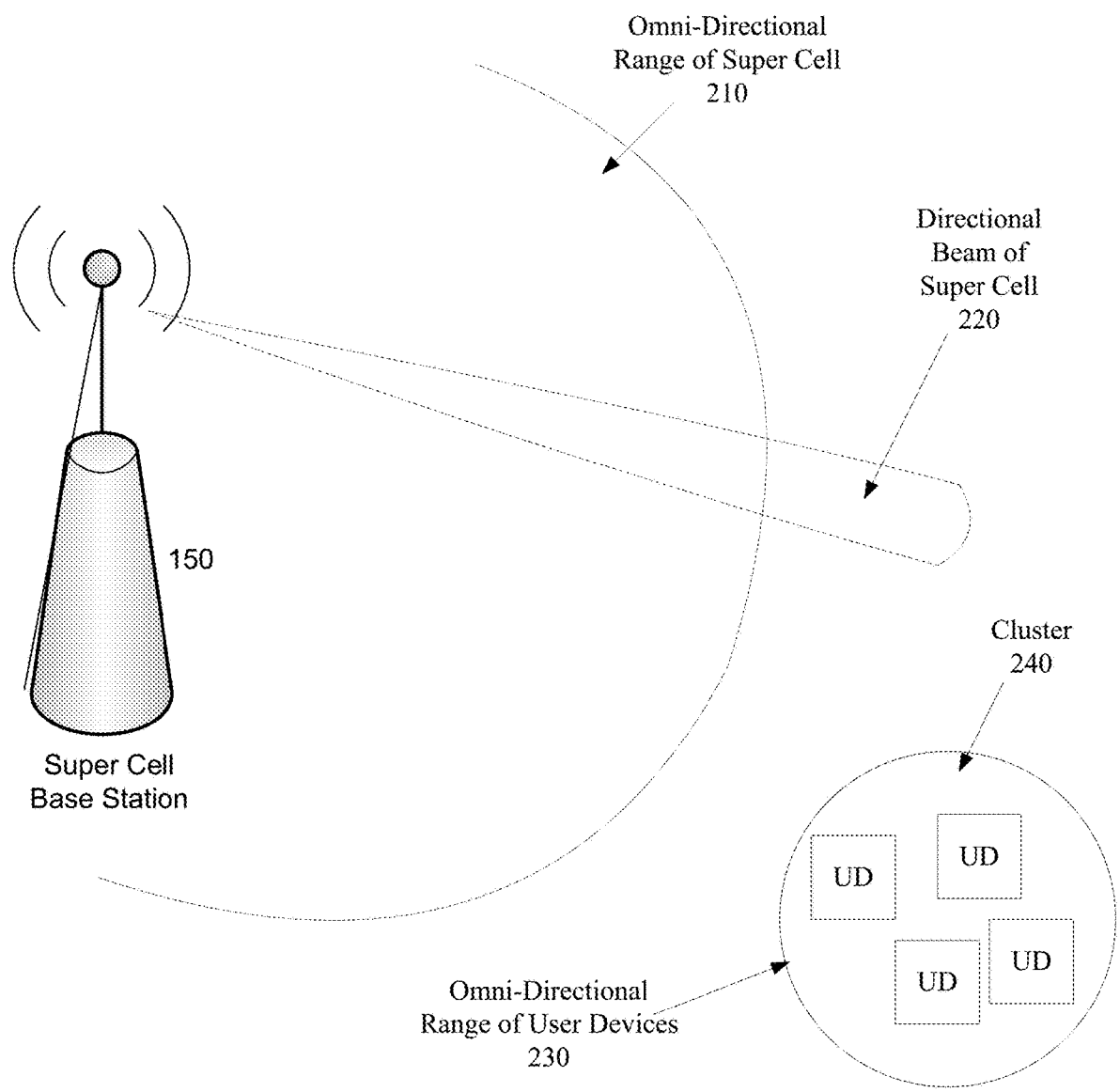
FIG. 2 shows an omni-directional beam range and a directional beam range of a supercell base station, and an approximate omni-directional beam range of user devices, according to an embodiment.

FIG. 2 shows the omnidirectional beam range 210 and directional beam 220 of a supercell base station 150, and an approximate omnidirectional beam range 230 of a cluster of user devices (UDs) 240, according to an embodiment. The supercell base station 150 is located a distance D from the cluster of user devices (UDs) 240, wherein the distance D is greater than the distances of the omnidirectional range of the supercell base station 150 and the omnidirectional ranges of the cluster of user devices (UDs) 240.

In radio communication, an omnidirectional antenna is a class of antenna which radiates equal radio power in all directions perpendicular to an axis, with power varying with angle to the axis, declining to zero on the axis. The omni-directional antenna radiates with equal radio power in all directions perpendicular to an axis (azimuthal directions), with power varying with angle to the axis (elevation angle), declining to zero on the axis. When graphed in three dimensions this radiation pattern is often described as doughnut-shaped.

A directional antenna or beam antenna is an antenna which radiates or receives greater power in specific directions can provide increased performance and reduced interference from unwanted sources. Due to the focused energy of a directional beamforming pattern, the range of a directional beamforming pattern is greater than the range of an omnidirectional beamforming pattern.

For at least some embodiments, the user devices (UDs) are handheld mobile devices that cannot support high-power wireless communication. Further, the UDs include antennas that only transmit with an omnidirectional antenna pattern. The supercell base station includes an antenna array, and accordingly, can form directional beams with an extended range over an omnidirectional antenna pattern.

The direction of a directional beamforming pattern can be set or adjusted by controlling an amplitude and/or phase of signal being electromagnetically transmitted or received through the array of antennas. However, a desired direction for pointing the directional beam needs to be determined. For an embodiment, a direction of a beam of the supercell base station is directed by adjusting an amplitude and/or phase of signals communication through a plurality of antennas of the supercell base station. Alternatively, an antenna (such as, a dish antenna) is mechanically adjusted to set the direction of a beam formed by the antenna.

If the distance between the supercell base station 150 and the cluster of UDs is greater than the omnidirectional ranges of the supercell base station 150 and the cluster of UDs, then at least one of the supercell base station 150 and the cluster of UDs must have a directionally formed antenna pattern in order to support wireless communication between the supercell base station 150 and the cluster of UDs. As described, the UDs are low-power devices that do not support a directional beam. Therefore, the supercell base station 150 must form a directional beam in order for the supercell base station 150 and UDs of the cluster of UDs to wirelessly communicate. However, the supercell base station 150 needs some means for determining the direction of a formed directional beam.

Figure 3:
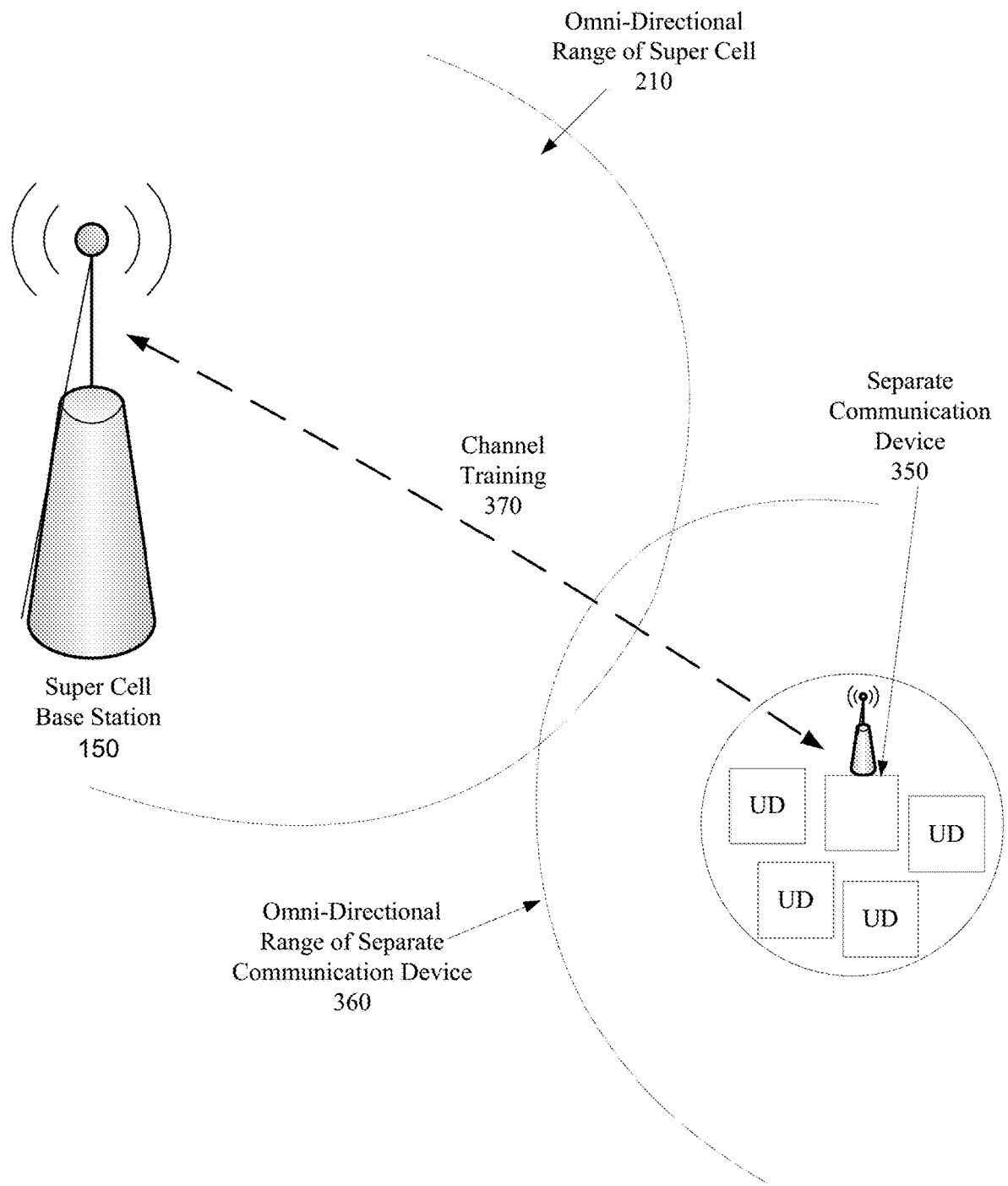
FIG. 3 shows the omni-directional beam range of a supercell base station, and an omni-directional beam range of a separate communication device located proximate to user devices, according to an embodiment.

FIG. 3 shows the omni-directional beam range 210 of a supercell base station, and an omni-directional beam range 360 of a separate communication device 350 located proximate to user devices UDs) 240, according to an embodiment. For an embodiment, the separate communication device 350 is a higher-power device (higher power than any of the user devices UDs) 240) located proximate to the user devices UDs 240. For an embodiment, the separate communication device 350 is utilized for characterizing a transmission channel between the separate communication device 350 and the supercell base station 150. The separate communication device 350 is able to achieve this because the range of the omnidirectional antenna pattern of the supercell base station 150 overlaps with the range of the omnidirectional antenna of the separate communication device 350.

For an embodiment, once the separate communication device 350 has connected to the supercell base station 150, the separate communication device 350 operates to characterize the transmission channel between the separate communication device 350 and the supercell base station 150. For an embodiment, characterizing the transmission channel includes the base station 150 transmitting known training tones or training signals one or more times at one or more carrier frequencies. The separate communication device 350 receives the training signals (training channel 370). By knowing characteristics of the transmitted training signals, the separate communication device is able to estimate the transmission channel based on the received training signals and the known characteristics of the transmitted training signals For an embodiment, the separate communication device 350 transmits the characterized transmission channel to the supercell base station 150. For an embodiment, the separate communication device 350 operates to form a directional antenna pattern based on the characterized transmission channel. For an embodiment, the separate communication device 350 transmits the characterized transmission channel to the supercell base station 150 through a directional beam, wherein the beam is directed from the separate communication device 350 to the supercell base station 150. For an embodiment, the separate communication device 350 forms the directional beam based on the characterized transmission channel between the supercell base station 150 and the separate communication device 350.

For an embodiment, the supercell base station 150 generates a direction beamforming pattern directed to the separate communication device 350 based on the characterized transmission channel received from the separate communication device 350.

The underlining premise is that due to transmission power constraints and antenna gains, omnidirectional antenna patterns at both ends (between the supercell base station and the user devices) of the wireless communication link will not support a wireless link. One of the devices must have a directional antenna pattern and the other can be omnidirectional. For an embodiment, the user devices can only support omnidirectional antenna patterns. Therefore, the supercell base station must have that ability to form a directional antenna pattern. The problem is that the supercell base station needs a channel characterization in order to support a directional antenna pattern. The separate communication device allows for channel characterization because its antenna gain and range of the separate communication device are greater than the antenna gain and range of the user devices (UDs).

Figure 4:
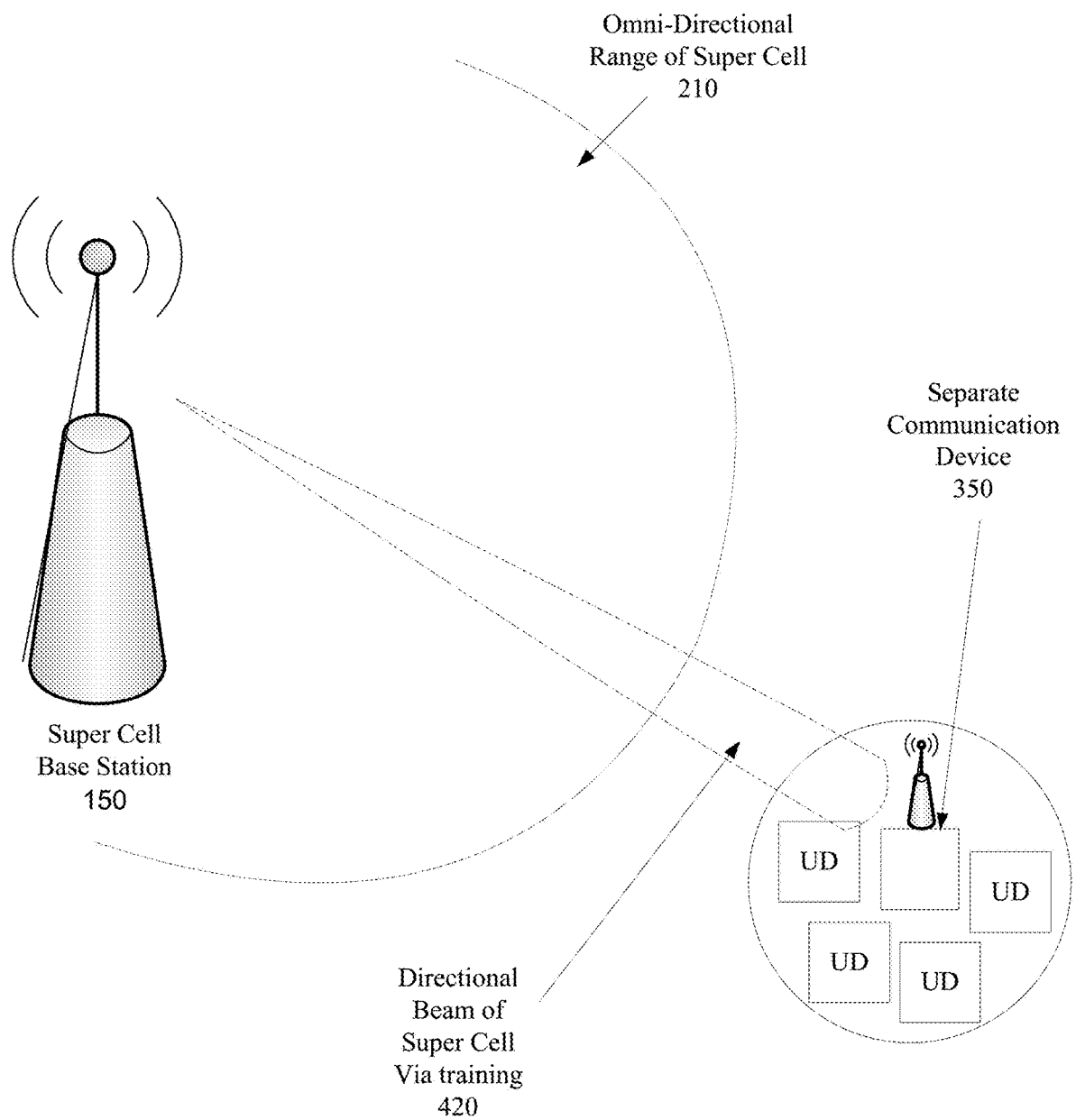
FIG. 4 shows a directional beam range of a supercell base station, and an approximate omni-directional beam range of user devices, according to an embodiment.

FIG. 4 shows a directional beam 420 of a supercell base station 150, and an approximate omni-directional beam range of the cluster of user devices, according to an embodiment. As shown in FIG. 4, the directional beam of the supercell base station 150 has a direction that makes communication with the user devices possible. That is, the range of the directional beam 420 of the supercell base station based on the characterized channel overlaps with the omnidirectional beam range of the cluster of user devices. Therefore, wireless communication between the cluster of user devices and the supercell base station 150 becomes possible.

Figure 5:
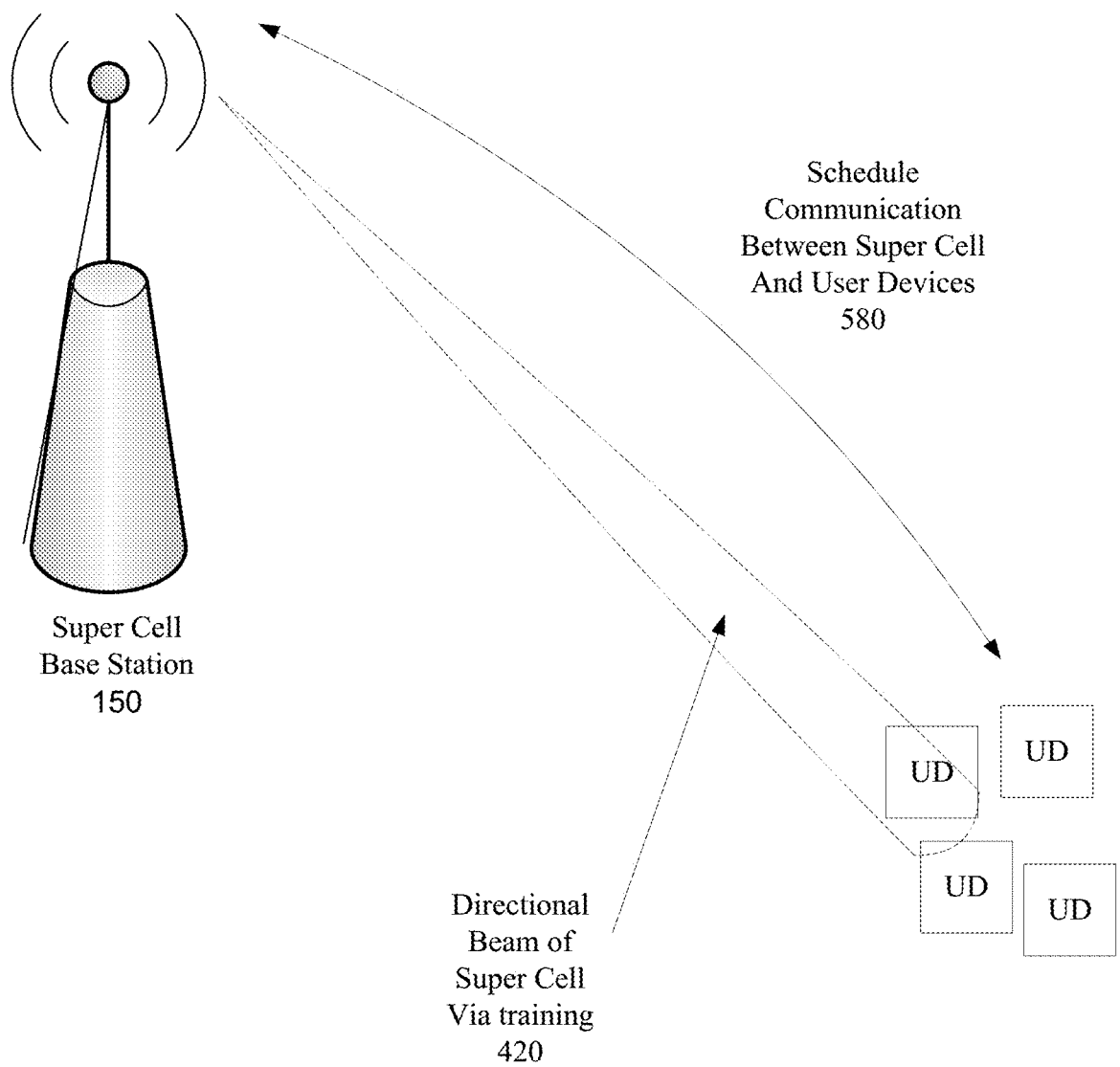
FIG. 5 shows a supercell base station communicating with a plurality of user devices through a directional beam, according to an embodiment.

FIG. 5 shows a supercell base station communicating with a plurality of user devices through a directional beam, according to an embodiment. With the directional beam of the supercell base station 150 overlapping with the omnidirectional beam range of the cluster of user devices, uplink and downlink wireless communication can occur between the supercell base station 150 and each of the cluster of user devices. For an embodiment, the supercell base station 150 obtains information about the user devices. For an embodiment, the information includes a location of one or more of the user devices. For an embodiment, the information includes characteristics of wireless signal communicated or received by one of more of the user devices.

For an embodiment, downlink (from the supercell base station 150 to one of more of the plurality of users) wireless communication is scheduled (580). That is, a scheduler located in the supercell base station 150 or located within a network device (such as, an central controller) connected to the supercell base station 150 determines, controls, or allocates the selection of blocks of time and/or frequency in which the supercell base station 150 wirelessly communicates with the one or more of the plurality of user devices. According to the schedule, the supercell base station 150 communicates with the one or more of the plurality of user devices. For an embodiment, the supercell base station 150 communicates the schedule to the plurality of user devices, and based on the schedule, the supercell base station 150 and each of the plurality of user devices know when to perform and expect the wireless communication between the supercell base station 150 and each of the plurality of user devices.

For an embodiment, the downlink wireless communication is facilitated by the supercell base station 150 broadcasting or multicasting wireless information through the formed directional beam. Each of the user device is informed and able to receive the wireless information based on characteristics of the broadcast or multicast wireless information.

For at least some embodiments, the supercell base station 150 transmits pilot information to each of the plurality of user devices. Based on the received signal, and measured characteristics of the received signal, the user device estimates the channel at a per-subcarrier level. Once the channel estimate is available at the user device, the incoming data signals can be decoded.

For at least some embodiments, uplink (from the to one of more of the plurality of users to the supercell base station 150) wireless communication is scheduled. That is, a scheduler located in the supercell base station 150 or located within a network device (such as, the central controller) connected to the supercell base station 150 determines, controls, or allocates the selection of blocks of time and/or frequency in which the one or more of the plurality of user devices communicates with the supercell base station 150. According to the schedule, the one or more of the plurality of user devices communicates with the supercell base station 150. The supercell base station 150 communicates the schedule to the plurality of user devices, and based on the schedule, the supercell base station 150 and each of the plurality of user devices know when to perform and expect the uplink wireless communication between the supercell base station 150 and each of the plurality of user devices.

Figure 6:
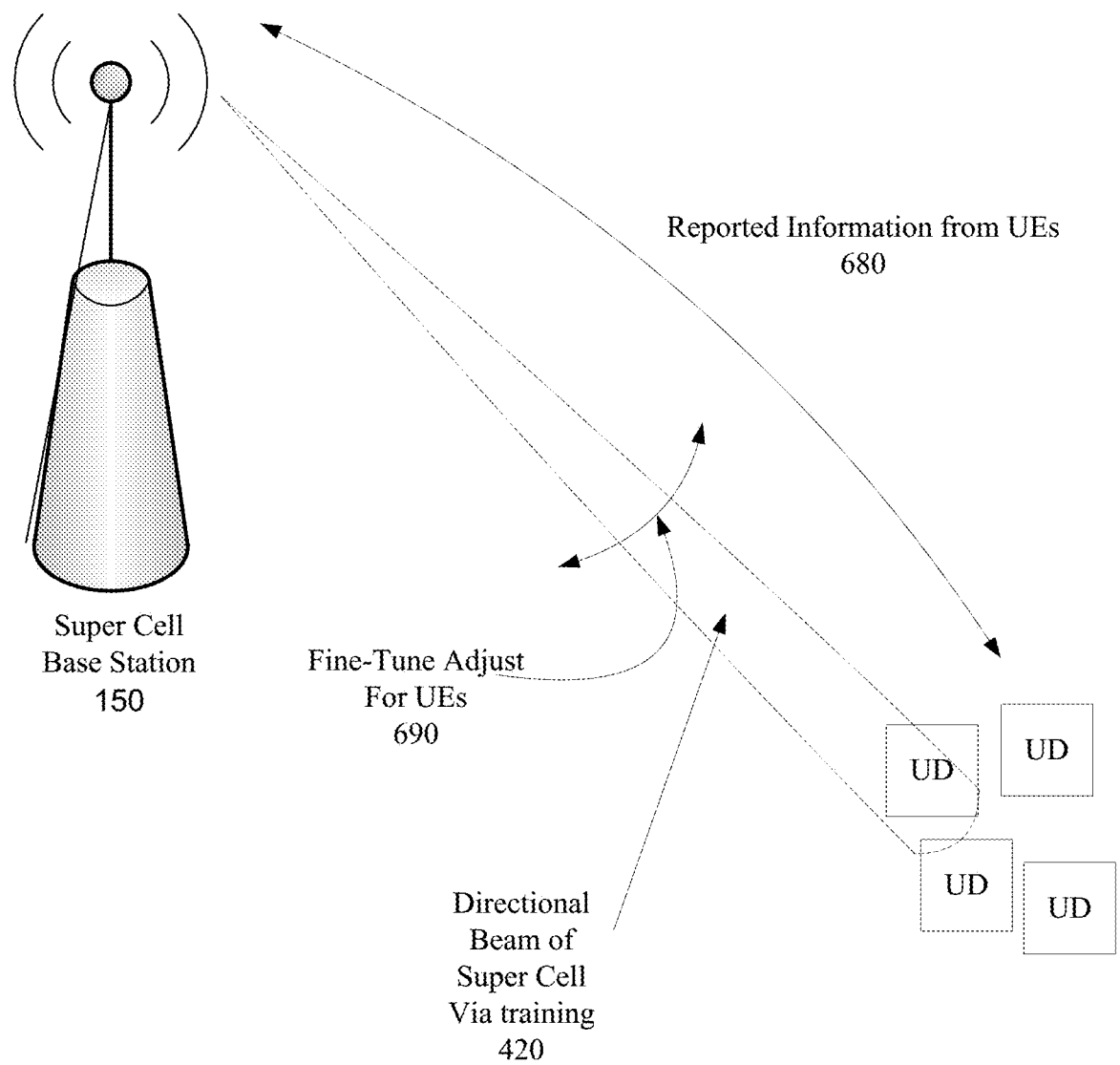
FIG. 6 shows a supercell base station communicating with a plurality of user devices through a directional beam, and fine-tuning a direction of the directional beam, according to an embodiment.

FIG. 6 shows a supercell base station 150 communicating with a plurality of user devices through a directional beam 420, and fine-tuning 690 a direction of the directional beam, according to an embodiment. While the beam direction determined by the estimated channel provided by the separate communication device may be good enough to support wireless communication between the supercell base station 150 and one or more of the user devices, at least some embodiments include adjusting the beam direction after establishing wireless communication between the supercell base station 150 and the one or more of the user devices to improve the direction of the beam direction. For an embodiment, the adjusting of the beam provides for maximizing (or at least improving) a capacity for that user. That is, while the direction of the beam determined based on the estimated channel provided may be good enough to support wireless communication to one or more of the user devices, there may be room for improving the direction to one or more specific of the user devices, thereby improving the link quality between the supercell base station 150 and the one or more of the user devices.

For an embodiment, the supercell base station 150 adjusts the beam direction based on a location of the one or more of the plurality of user devices. For an embodiment, the supercell base station 150 adjusts the beam direction based on a location of the one or more of the plurality of user devices and a location of the separate communication device. That is, the direction can be adjusted based on the location differences between the one or more of the plurality of user devices and the separate communication device. The location difference may be used to adjust the direction of the beam direction to more closely fit the location of the one or more user devices.

For an embodiment, the supercell base station 150 adjusts the beam direction based on perturbations of the beam direction. The user devices can receive wireless signals from the supercell base station and estimate the quality of the wireless link between the user devices and the supercell base station. For an embodiment, the supercell base station 150 sweeps the direction of the beam direction around the direction of the beam direction determined based on the estimated transmission channel. For each of a plurality of sweep settings, the one or more user devices provide feedback (reported information form UEs 680) on the signal quality of wireless signals received from the supercell base station. Based on the feedback of the signal quality for multiple adjustments of the beam direction, a better direction may be identified. The better direction can be based upon the signal quality feed back of one of the user devices, or multiple of the user devices. That is, for an embodiment, each user device may have its own separate adjusted direction determined based on the signal quality information provided by the user device. For an embodiment, an adjusted direction for multiple user devices may be selected based on a statistical analysis of the signal quality information provided by the multiple user devices.

For an embodiment, one or more of the user devices that make up the largest amount of the data traffic of the wireless communication with the supercell base station may be weighted higher, and have a greater influence on the selection of the direction adjustment. For an embodiment, if the wireless communication is time multiplexed, then a slightly different direction adjustment may be applied to different of the user devices. That is, each of multiple user devices may provide a direction adjustment, and when communicating with the corresponding wireless device, and different direction adjustment may be applied. As will be described, the directional adjustment for each of the user devices can be monitored and updated based on a location of each of the user device relative to a location of the separate communication device.

Figure 7:
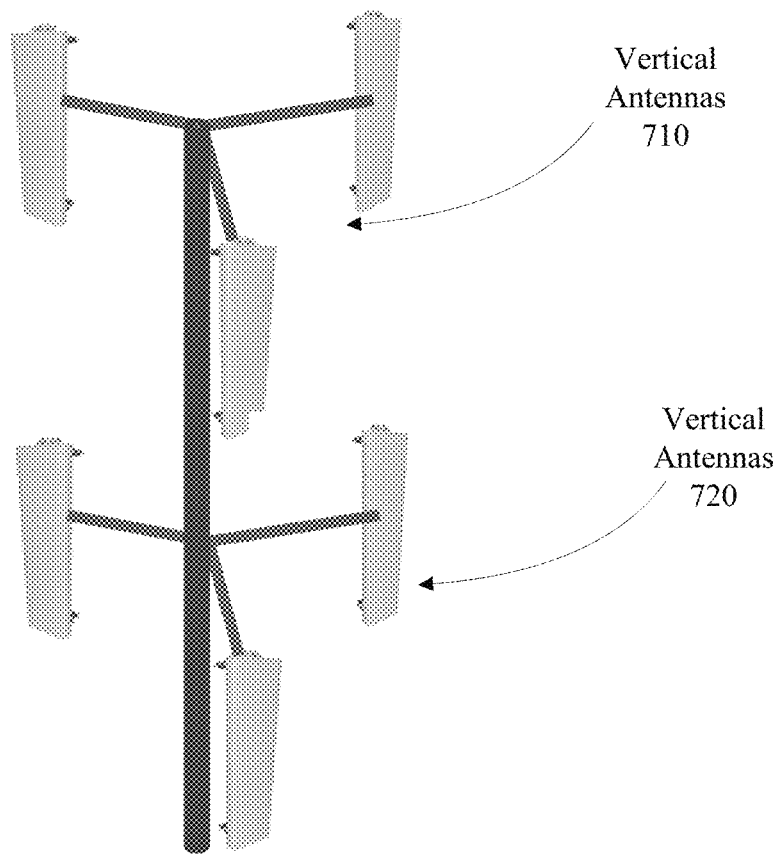
FIG. 7 shows a vertically oriented antenna array of a supercell base station, according to an embodiment.

FIG. 7 shows a vertically oriented antenna array of a supercell base station, according to an embodiment. For an embodiment, the large distances between the supercell base station and the user devices influences how multiple antenna elements of the supercell base station are located on the supercell base station. For an embodiment, the antenna elements (such as, vertically oriented antennas 710, 720) are vertically located on the supercell base station. For an embodiment, the vertically placed antenna elements are located so that the vertically placed antenna elements cover a surface area a tower of the supercell base station to minimize added wind resistance. That is, vertically oriented antennas that extend beyond the surface area of the tower of the base station will add wind resistance. Due to the large surface area of the tower of a supercell base station, the added wind resistance can be substantial. Further, the large surface area provides the ability to locate the vertically oriented antennas such that they add minimal additional wind resistance.

Figure 8:
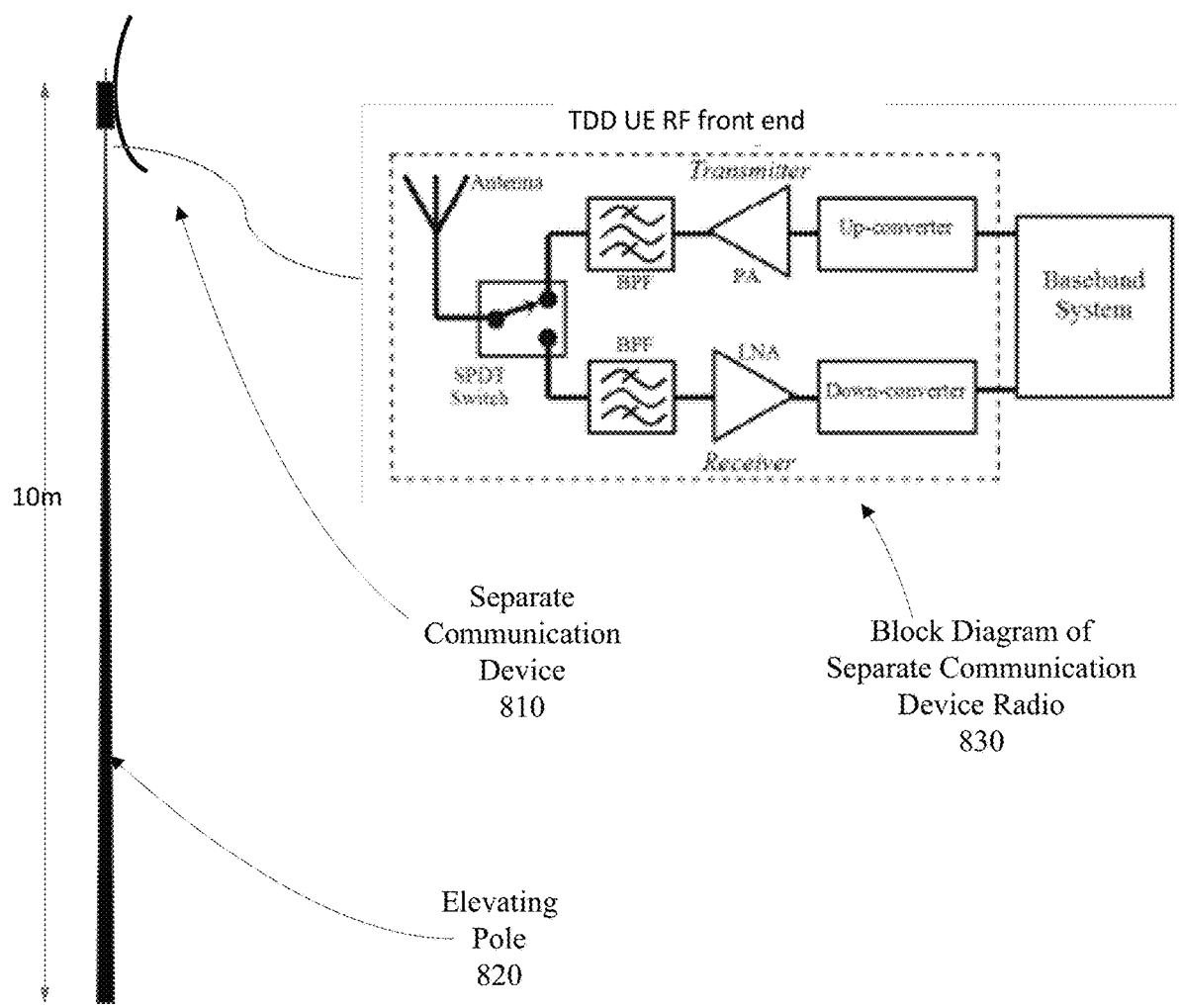
FIG. 8 shows a separate communication device, according to an embodiment.

FIG. 8 show a separate communication device 810, according to an embodiment. For an embodiment, the separate communication device 810 includes a tall (taller or higher in elevation than any of the user devices) antenna. As described, the estimation of the transmission channel is performed by the separate communication device 810. Therefore, the separate communication device 810 must be able to form an omnidirectional antenna pattern that has a range great enough to overlap with an omnidirectional antenna pattern formed by the supercell base station. As previously described, for an embodiment, the separate communication device 810 receives wireless signals (for example, training signals) from the supercell base station. The separate communication device 810 then estimates the transmission channel between the supercell base station and the separate communication device 810 based on the receive wireless signals. In order to do this, the separate communication device 810 must have a relatively high gain antenna compared to the UDs. The embodiment of the separate communication device 810 of FIG. 8 can be obtained by making simple modifications to an antenna front end of commercially available user equipment device. Further, as shown, the separate communication device 810 is elevated on an elevating pole 820 so that the separate communication device 810 is elevated higher than any of the UDs. As described, for an embodiment, the separate communication device 810 communicates the estimated transmission channel back to the supercell base station, thereby allowing the supercell base station to form a directional beam based on the estimates channel. Further, the separate communication device 810 communicates a location of the separate communication device 810 back to the supercell base station.

For at least some embodiments, a block diagram of a separate communication device radio 830 of a separate communication device includes an antenna, filters, transmitter and receiver chains, and a baseband system.

As described, the separate communication device 810 is located proximate to the cluster of user devices. Proximity can be determined by the physical distance between the separate communication device 810 and one or more of the plurality of user devices. For an embodiment, proximity is defined as the maximum allowed radial distance between the separate communication and the user equipment such that the channel estimates can be considered approximately same in all locations within this radial distance. However, proximity can also be determined by a similarity in the transmission channels between the one or more of the user devices and the supercell base station, and the transmission channel between the separate communication device 810 and the supercell base station.

For at least some embodiments, proximity is defined by the correlation between the transmission channels of the UDs and the transmission channel of the separate communication device not just the proximity of location. There are several experimental techniques to evaluate this correlation. The correlation can be determined and verified using ray-tracing simulation software or direct field measurements and evaluating the correlation among the measurements. For an embodiment, the estimated transmission channel of the separate device is used by the base station to form a beam with the UDs if the transmission channel of the separate communication devices is within a threshold of similarity with the transmission channels of the UDs. As previously described, for an embodiment this is true if the separate communication device is within a threshold distance of the UDs. As previously described, the omnidirectional beam formed by the separate communication devices covers a greater range than omnidirectional beams formed by the UDs.

As described, proximity of the UDs to the separate communication device can be defined by the maximum allowed radial distance, wherein the maximal allowed radial distance is a distance in which the transmission channels between the supercell base station and the separate communication device and the supercell base station and the UDs are correlated to each other within a threshold amount. That is, within the maximum allowed radial distance the transmission channel between the supercell base station and the separate communication device and the supercell base station and the UDs are close enough that the supercell base station is able to achieve wireless communication with the UDs through a directional beam formed based on the characterized transmission channel provided by the separate communication device.

For an embodiment, if the UDs are determined to be located within the maximum allowed radial distance of the separate communication device, then the characterized transmission channel provided by the separate communication device is used for wireless communication between the supercell base station and the UDs. However, if one or more of the UDs is a mobile device that wanders outside of the maximum allowed radial distance, an adjustment to the direction of the directional beam formed by the supercell base station may be initiated. The adjustment can be performed as previously described. That is, the beam direction may be adjusted purely on a location of the one or more UDs relative to the location of the separate communication device, or the direction of the beam may be swept through multiple directions and feedback from the one or more UDs is monitored to determine the desired direction. For an embodiment, the sweep starts with or is centered on the direction of the directional beam as determined based on the characterized transmission channel provided by the separate communication device. Either way, the directional beam as determined based on the characterized transmission channel provided by the separate communication device provides a basis for the sweep.

For an embodiment, the locations of the UDs are monitored, and beam directions for one or more of the UDs adjusted based on the locations of the UDs relative to the separate communication device. As previously described, the modified directions of the each of the UDs can be monitored, and used when wirelessly communicating with the corresponding UD.

FIG. 9 is a flow chart that includes steps of a method of for assisted channel approximation wireless communication of a supercell base station. A first step 910 includes omni-directionally transmitting, by a supercell base station, training signals, wherein a plurality of user devices is located too far away to support omnidirectional electromagnetic communication with the supercell base station. A second step 920 includes omni-directionally receiving, by a separate communication device, the training signals, wherein the separate communication device is located proximate to the plurality of user devices. A third step 930 includes characterizing, by the separate communication device, a transmission channel between the supercell base station and the separate communication device. A fourth step 940 includes directionally transmitting, by the separate communication device, the characterized transmission channel to the base station. A fifth step 950 includes directionally transmitting, by the supercell base station, wireless communication to the plurality of user devices through a beam based on the characterized transmission channel.

As previously described, an embodiment further includes obtaining, by the supercell base station, information from one or more of the plurality of user devices after the supercell base station is connected to the one or more of the plurality of user devices. As previously described, an embodiment further includes fine tuning, by the supercell base station, the directional beam. As previously described, an embodiment further includes fine tuning the directional beam for the one or more of the plurality of user devices includes adjusting a direction of the directional beam based on a location of the one or more of the plurality of user devices and a location of the separate communication device. As previously described, an embodiment further includes fine tuning the directional beam for the one or more of the plurality of user devices comprises perturbating the direction of the directional beam and monitoring signal quality of wireless signal communicated with the one or more of the plurality of user devices.

As previously described, an embodiment further includes the plurality of antennas of the supercell base station are oriented vertically, wherein the vertically oriented antennas are arranged on the supercell base station to minimize a force on the supercell base station due to wind. As previously described, for an embodiment the vertically oriented antennas are arranged to overlap a surface area of the supercell base station to minimize force on the supercell base station due to wind.

Although specific embodiments have been described and illustrated, the embodiments are not to be limited to the specific forms or arrangements of parts so described and illustrated. The described embodiments are to only be limited by the claims.

What is claimed:
1. A wireless network, comprising:
a supercell base station comprising a plurality of antennas;
a plurality of user devices, wherein the plurality of user devices are located too far away to support omnidirectional electromagnetic communication with the supercell base station;
a separate communication device located proximate to the plurality of user devices, wherein the separate communication device is a higher-power device than the plurality of user devices and can support omnidirectional communication with the supercell base station, wherein the separate communication device being proximate to the plurality of user device includes a transmission channel of the separate communication device with the supercell base station being within a threshold of similarity with transmission channels of the plurality of user devices with the supercell base station, and wherein the separate communication device operates to:
- receive omnidirectional wireless signals from the supercell base station that include training signals;
- characterized the transmission channel between the supercell base station and the separate communication device based on the training signals included within the omnidirectional wireless signals received from the supercell base station;
- directionally transmit the characterized transmission channel back to the supercell base station;

wherein the supercell base station operates to:
- directionally transmit wireless communication signals through a directional beam to the plurality of user devices based on the characterized transmission channel provided by the separate communication device.

2. The wireless system of claim 1, wherein the supercell base station operates to obtain information from one or more of the plurality of user devices after the supercell base station is connected to the one or more of the plurality of user devices.

3. The wireless system of claim 2, wherein the supercell base station further operates to fine tune the directional beam.

4. The wireless system of claim 3, wherein fine tuning the directional beam for the one or more of the plurality of user devices comprises adjusting a direction of the directional beam based on a location of the one or more of the plurality of user devices and a location of the separate communication device.

5. The wireless system of claim 3, wherein fine tuning the directional beam for the one or more of the plurality of user devices comprises perturbating a direction of the directional beam and monitoring signal quality of wireless signal communicated with the one or more of the plurality of user devices.

6. The wireless system of claim 1, wherein each of the user devices identifies whether the wireless communication signals are intended for the user device.

7. The wireless system of claim 1, wherein each of the user devices identifies whether the wireless communication signals are intended for the user device based on a communication schedule.

8. The wireless system of claim 1, wherein the wireless communication signals are transmitted from the base station as multicast signals, and each user device determines whether the multicast signal is intended for the user device.

9. The wireless system of claim 1, wherein the supercell base station operates to:
- directionally receive wireless communication back from the user devices according to a predetermined communication schedule.

10. The wireless system of claim 1, wherein the plurality of antennas of the supercell base station are oriented vertically.

11. The wireless system of claim 10, wherein the vertically oriented antennas are arranged on the supercell base station to minimize a force on the supercell base station due to wind.

12. The wireless system of claim 10, wherein the vertically oriented antennas are arranged to overlap a surface area of the supercell base station to minimize force on the supercell base station due to wind.

13. A method, comprising:
- omni-directionally transmitting, by a supercell base station, training signals, wherein a plurality of user devices is located too far away to support omnidirectional electromagnetic communication with the supercell base station;
- omni-directionally receiving, by a separate communication device, the training signals, wherein the separate communication device is located proximate to the plurality of user devices, wherein the separate communication device is a higher-power device than the plurality of user devices and can support omnidirectional communication with the supercell base station, wherein the separate communication device being proximate to the plurality of user device includes a transmission channel of the separate communication device with the supercell base station being within a threshold of similarity with transmission channels of the plurality of user devices with the supercell base station, and
- characterizing, by the separate communication device, the transmission channel between the supercell base station and the separate communication device based on the omni-directionally received training signals;
- directionally transmitting, by the separate communication device, the characterized transmission channel to the supercell base station; and
- directionally transmitting, by the supercell base station, wireless communication to the plurality of user devices through a directional beam based on the characterized transmission channel between the supercell base station and the separate communication device.

14. The method of claim 13, further comprising obtaining, by the supercell base station, information from one or more of the plurality of user devices after the supercell base station is connected to the one or more of the plurality of user devices.

15. The method of claim 14, further comprising fine tuning, by the supercell base station, the directional beam.

16. The method of claim 15, wherein fine tuning the directional beam for the one or more of the plurality of user devices comprises adjusting a direction of the directional beam based on a location of the one or more of the plurality of user devices and a location of the separate communication device.

17. The method of claim 15, wherein fine tuning the directional beam for the one or more of the plurality of user devices comprises perturbating the direction of the directional beam and monitoring signal quality of wireless signal communicated with the one or more of the plurality of user devices.

18. The method of claim 13, wherein the wireless communication signals are transmitted from the base station as multicast signals, and each user device determines whether the multicast signal is intended for the user device.

19. The method of claim 13, wherein the plurality of antennas of the supercell base station are oriented vertically, wherein the vertically oriented plurality of antennas are arranged on the supercell base station to minimize a force on the supercell base station due to wind.

20. The method of claim 19, wherein the vertically oriented plurality of antennas are arranged to overlap a surface area of the supercell base station to minimize force on the supercell base station due to wind.

* * * * *